(12) United States Patent
Unice

(10) Patent No.: US 6,839,764 B2
(45) Date of Patent: Jan. 4, 2005

(54) DOMAIN ENCAPSULATION

(75) Inventor: Warren K. Unice, Sandy, UT (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 09/885,370

(22) Filed: Jun. 20, 2001

(65) Prior Publication Data

US 2002/0198998 A1 Dec. 26, 2002

(51) Int. Cl.$^7$ .............................. G06F 15/16
(52) U.S. Cl. ............ 709/230; 709/201; 709/227; 709/238; 709/245; 370/431; 370/465; 370/474; 710/3; 710/316
(58) Field of Search ................. 709/201, 227, 709/230, 238, 245; 370/431, 465, 474; 710/3, 316

(56) References Cited

U.S. PATENT DOCUMENTS

| | | | | |
|---|---|---|---|---|
| 5,774,660 A | * | 6/1998 | Brendel et al. | 709/201 |
| 6,182,148 B1 | * | 1/2001 | Tout | 709/245 |
| 6,324,582 B1 | * | 11/2001 | Sridhar et al. | 709/230 |
| 2002/0087722 A1 | * | 7/2002 | Datta et al. | 709/239 |

* cited by examiner

*Primary Examiner*—Hosain Alam
*Assistant Examiner*—ThuHa Nguyen
(74) *Attorney, Agent, or Firm*—Blakely, Sokoloff, Taylor & Zafman LLP

(57) ABSTRACT

A system for processing Internet requests that permits multiple binds to the same socket number at the same time on the same computer. A separate domain processing shell may be provided for each domain being hosted on a particular platform, and each domain may be mapped to a unique IP address. When a request for a service is received with a first IP address, that request may be routed to the associated shell, where it is bound to the designated socket number. When a request with a second IP address is received for the same service, it may be routed to another shell and be bound to the same socket number.

17 Claims, 5 Drawing Sheets

DOMAIN ENCAPSULATION

BACKGROUND OF THE INVENTION

1. Field of the Invention

The invention pertains generally to computer networks. In particular, it pertains to the management of computer network services.

2. Description of the Related Art

Internet service providers (ISPs) offer network functionality to users in the form of storage, processing power, network connections, and various services such as electronic mail (email), file transport protocol (FTP), web server (HTTP), and others. Each domain, identified with a domain name, is generally associated with a particular client. The ISP services are predefined to be associated with 'sockets', such as socket 21 for FTP and socket 25 for email. Up to 65,536 sockets are permitted by the addressing convention, with most of these still being available for new user-defined services as requests to provide those services are received. A conventional ISP may divide the overall workload among different computers by using a single computer to host only one type of service. For example, email service for all domains will be hosted on a first computer (or a first group of computers if the email workload is great enough), while FTP service for all domains will be hosted on a second computer or group of computers. (A multi-processor computer might be viewed as a single computer for this purpose.) Each computer only has one instance of a particular socket number in operation at one time. Thus if domain xxx.com has a bind to socket 21, no other domain on that computer can bind to socket 21 until domain xxx.com has released it.

This approach to domain management has several disadvantages: 1) Since only one domain is bound to a given socket in the same computer at one time, this can create a bottleneck in network access to the associated service. 2) If the ISP manager wants to move a given user to other machines to balance the current traffic load, or to upgrade the user to higher capacity resources, each service for that user must be moved individually. 3) If a user's code crashes the computer, that service becomes unavailable to all users of that service on that computer. 4) Maintaining operational statistics and integrated billing information for each user is difficult, since the user's operations are spread over multiple computers.

DETAILED DESCRIPTION OF THE INVENTION

Various embodiments of the invention may encapsulate all services for a given domain into one computer platform by creating multiple sets of sockets on that computer, with each set associated with a particular domain and having the full range of necessary socket numbers for that domain. By providing this encapsulation under a single shell for each domain, the services for a given domain may be moved to another computer as a group. If user code for a service crashes, that service may still be available for other domains since they may be hosted on different computers, or at least isolated within their own shell on the same computer.

Domain encapsulation may be accomplished through domain multiplexing, which may enable the servicing of several domains on a given platform. This can be accomplished by isolating the processes and threads of the Internet services in a logical context, which can be provided through shells. This logical context may have networking libraries, network stack, and network interface cards, but the logical context may enable the sharing of resources among several shells. This can enable several instances of socket endpoints for various Internet services. For example, FTP requires the use of socket 21. With the domain multiplexing software, there may be N instances of a bind to socket 21. Each of these instances may be routed to correctly by using the domain multiplexing software.

Each domain hosted by the system may be associated with a unique IP address. In this manner, the destination IP address in each received request may be mapped to its associated domain, and the request may then be routed to a shell created for that domain. The shell may encompass all the services that are available for that particular domain, so that any service requested for that domain can be provided for within that shell.

Figure 1:
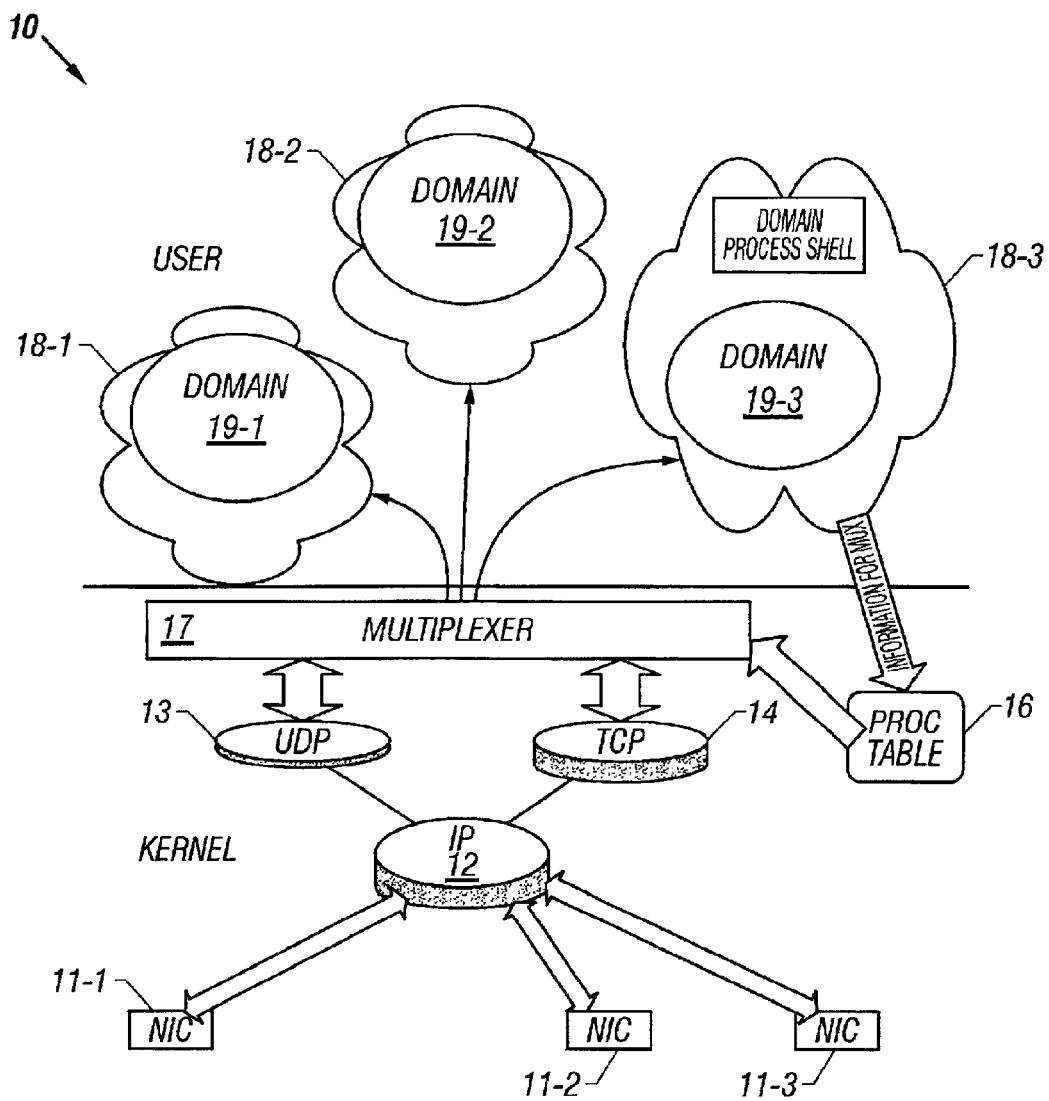
FIG. 1 shows a functional system diagram.

FIG. 1 shows a functional diagram of a system embodiment 10. System 10 may have multiple network interface cards (NIC) 11, such as the three illustrated NIC's 11-1, 11-2, and 11-3. NIC's may provide a physical interface to a network by providing the mechanical and electrical interface and by being designed to handle the particular protocol of the applicable network. In one embodiment, each NIC may be configured to handle multiple protocols. In one embodiment, each NIC may be configured to handle multiple IP addresses. The requests received by each NIC may be forwarded to multiplexor 17 to be routed to the proper domain. FIG. 1 shows two different protocols being handled: User Data Protocol (UDP) 13 and Transport Control Protocol (TCP) 14. Regardless of the protocol, the requests may be distributed to the various domain process shells (DPS) 18 by multiplexor 17, based on the IP address of the message. The kernel of the network operating system (NOS) may control this process.

A DPS may be set up for each domain being hosted by the system. The DPS may enable the logical execution context for domain services by isolating the processes and threads for a given domain within that particular shell. Each DPS may also provide the functions to apply to the set of services for a given domain such as start, stop, and mapping the networking services of a given domain. The DPS may also enable the collection of performance statistics for the use of the services within the domain. Through these techniques, the processing for each domain may be logically and functionally isolated from the processing for the other domains. FIG. 1 shows three DPS's 18-1, 18-2, and 18-3. Each DPS may act as host for a different domain, shown as 19-1, 19-2, and 19-3. Although FIG. 1 shows three NIC's and three domains, there is not necessarily any correlation between these numbers. The number of NIC's on a system and the number of domains being hosted on that system may be unrelated.

Multiplexor 17 may use the information in process table 16 to distribute the requests to the various DPS's. Process table 16 may contain a list of the enabled processes for each domain, information that may be provided by each DPS 18-x.

Figure 2:
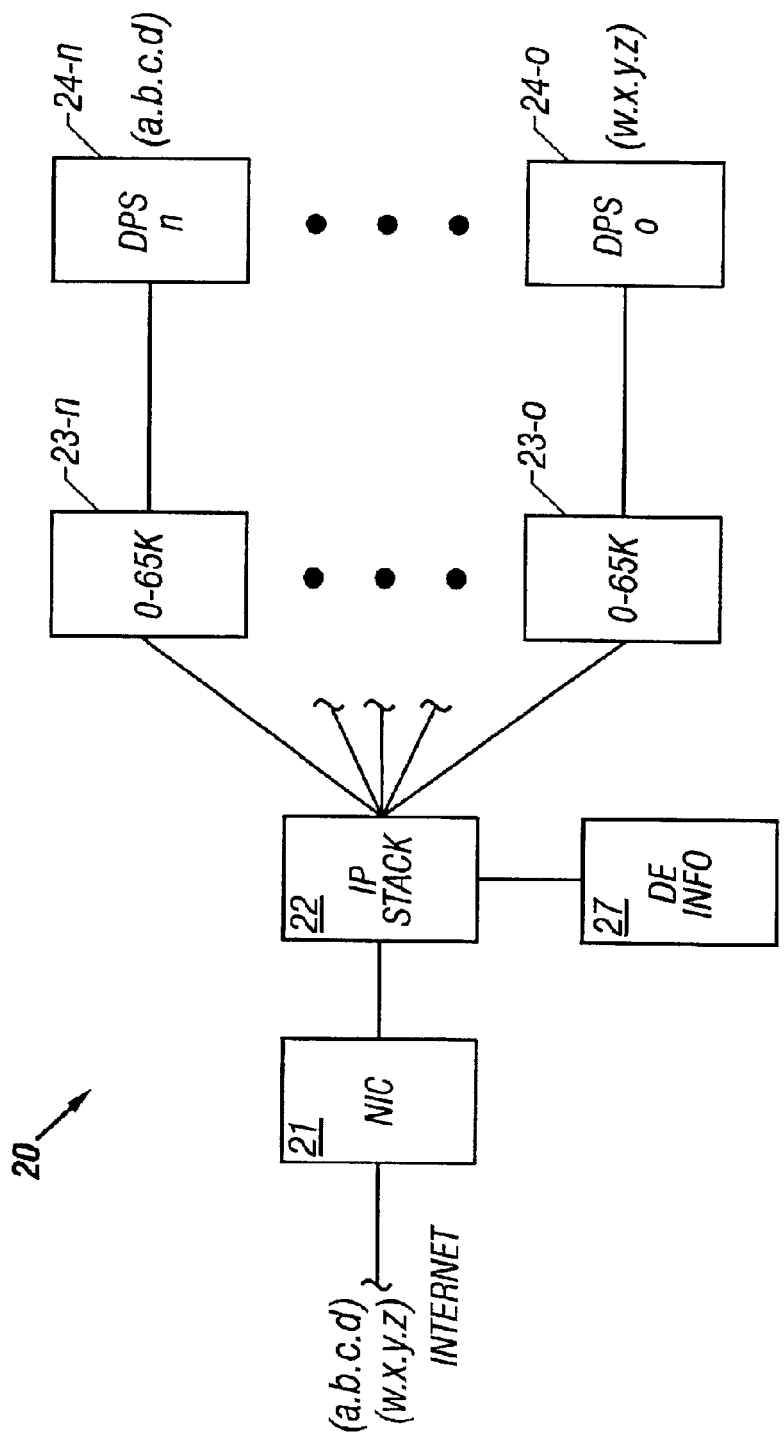
FIG. 2 shows another system diagram.

FIG. 2 shows a diagram of parts of a domain encapsulation (DE) embodiment 20. Network interface card (NIC) 21 may interface with the Internet by receiving transmissions that request a network service of some kind. NIC 21 may be multi-homed, i.e., multiple IP addresses may be assigned to it. Each request may be directed to a particular domain as specified by the destination IP address contained in the request. In the illustrated embodiment of FIG. 2, two requests are received—one to the domain represented by IP address a.b.c.d, and the other to the domain represented by IP address w.x.y.z. These addresses may be in the standard IP address format of four octets, with each octet being an 8-bit binary number or its equivalent. The connection to the Internet may be direct, or may be indirect through intermediate connections. NIC 21 may be chosen to interface with the particular protocol and media being used at the NIC interface, such as TCP/IP over an Ethernet local area network (LAN). Some NIC's may be configurable to be compatible with multiple types of media and/or protocols.

Once a request has been received by NIC 21, that request may be forwarded to Internet protocol (IP) stack 22 for handling. IP stack 22 may handle the distribution of each request received by routing it to the proper domain for processing, based on the contents of the request. Each domain being hosted by the computer may have its own domain process shell (DPS). The number of DPS's required may vary depending on how many domains are being hosted on a particular platform. FIG. 2 illustrates this by showing DPS 24-0 through DPS 24-n. Each DPS may also have an associated valid IP socket set, shown as 23-0 through 23-n. Each socket set may include all necessary sockets for the associated DPS. In one embodiment, each socket set may include all sockets permitted by the socket addressing convention, such as 65,536 sockets. In another embodiment, each socket set may include only the sockets needed for the services being hosted on that domain.

IP stack 22 may refer to domain encapsulation (DE) information 27 to determine which domain the request should be routed to. In one embodiment, DE information 27 may be a database correlating each domain being hosted with the associated IP address, and describing what services are provided for that IP address. In that manner, the contents of the request, including its destination IP address, may be used to determine which domain the message should be routed to. Once that determination has been made, the relevant portions of the request may select the correct socket from socket set 23-x and be placed in the correct DPS 24-x. In the illustrated embodiment of FIG. 2, IP address a.b.c.d is routed to DPS 24-n, while IP address w.x.y.z is routed to DPS 24-0.

Figure 3:
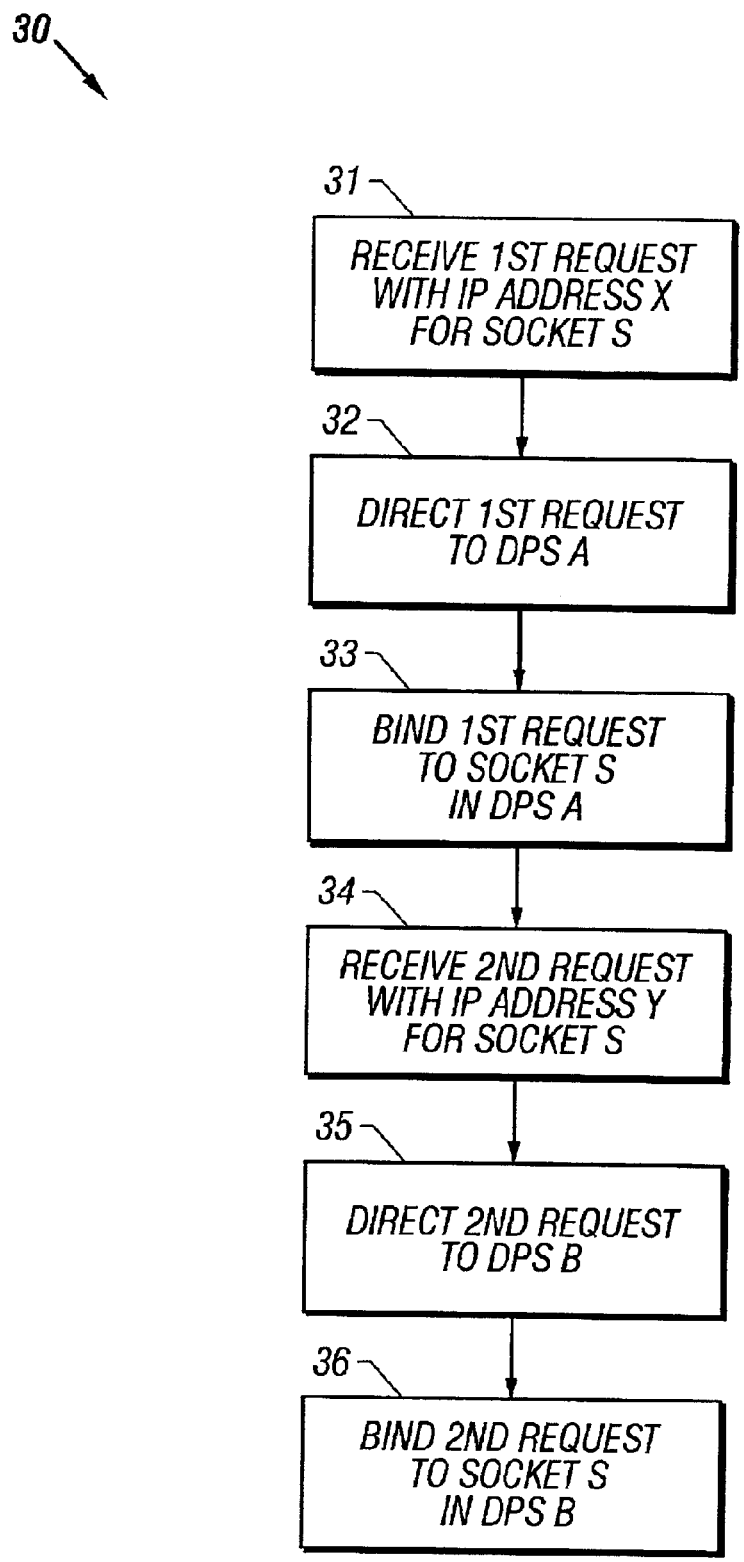
FIG. 3 shows a flow chart of a method embodiment.

FIG. 3 shows a flow chart 30 of a method embodiment. At block 31, a first request is received over the Internet. The first request may have an IP address generically referred to as X, and may request a service that has been designated as associated with a socket generically referred to as S. At block 32, this request may be directed to a particular domain processing shell A, which may be the shell that has been created to provide services for the domain associated with IP address X. In one embodiment, this direction may be accomplished by first placing the request in an IP stack to determine where it should be distributed. At block 33, the first request can be bound to socket S in domain processing shell A.

At block 34, a second request may be received over the Internet. The second request may have an IP address generically referred to as Y, and may request the same service as the first request, the service that has been designated as associated with a socket S. At block 35, the second request may be directed to a particular domain processing shell B, which may be the shell that has been created to provide services for the domain associated with IP address Y. In one embodiment, this direction may be accomplished by placing the request in the same IP stack as the first request, to determine where it should be distributed. At block 36, the second request can be bound to socket S in domain processing shell B. The binding of the second request in DPS B may occur during the time the first request is still bound in DPS A.

The use of a separate DPS for each domain, with each DPS having an independent set of available sockets, may create additional management features that are not available in a conventional system. The processing within a given shell may be shutdown, started up, or paused, without regard to the status of processing in any of the other shells. This may enable a particular shell, with all the processes and threads within it, to be moved from one computer to another.

Figure 4:
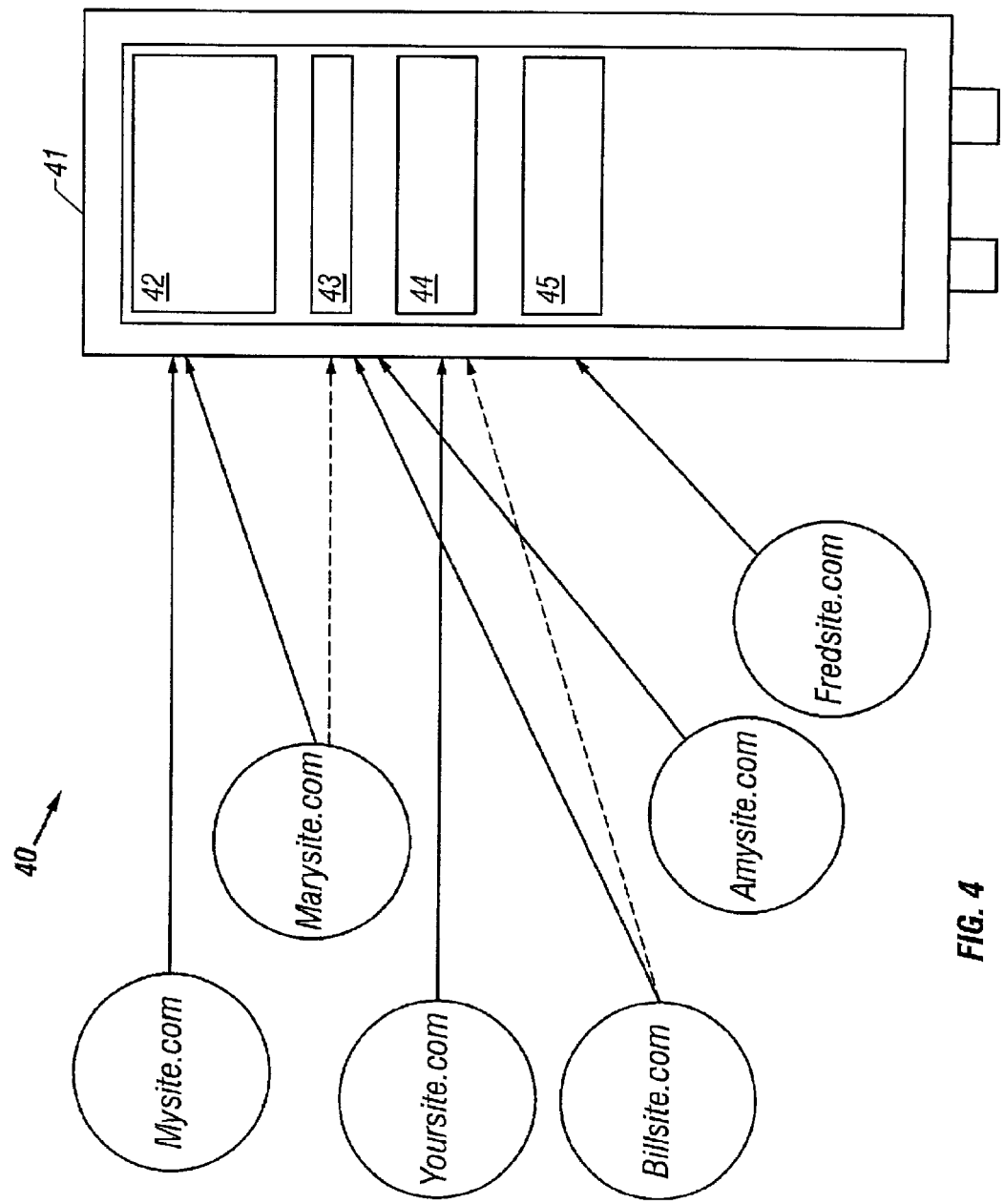
FIG. 4 shows a diagram of domain distribution between computers.

FIG. 4 shows a system 40 in which a group of network servers 42-45 are mounted in a typical rack 41. These may be representative of some of the servers operated by an Internet Service Provider (ISP). Server 42 may be a high-performance multi-processor system with a great deal of processing capacity, while servers 44 and 45 may be mid-performance systems and server 43 a low-performance system. To distribute the processing power where it is needed most, the illustrated embodiment of FIG. 4 shows the domains labeled Mysite.com and Marysite.com as popular domains that receive thousands of hits per hour, and are therefore hosted on the high-performance server 42. Billsite.com and Amysite.com may be owned by small businesses that receive only a few hits each day and therefore share the low performance server 43 with numerous other low-volume sites. Yoursite.com and Fredsite.com may be moderate-volume sites that are each hosted on a mid-performance server 44 or 45. In this way, the performance needs of each web site may be allocated in a way that makes best use of the available servers.

However, performance needs may change with time. If Billsite.com experiences rapid growth in popularity, it may soon outgrow the capacity of server 43 and need to be moved to a mid-performance server. By contrast, the owner of Marysite.com may decide to abandon electronic retailing and maintain a small site just to notify customers of this fact, thus leaving a great deal of unused capacity on server 42. Maintaining efficient use of resources dictates that the ISP relocate Marysite.com and Billsite.com to other servers. The dotted lines of FIG. 4 show Marysite.com being relocated to low-performance server 43 and Billsite.com being relocated to mid-performance server 44.

Moving an entire domain from one server to another could be burdensome and error-prone with a conventional system, and leave the web site down for an excessive period of time during the relocation. However, with domain encapsulation, the entire domain may be stopped, relocated as a single unit, and restarted in the new server. By keeping the various processes and threads of a domain encapsulated in a single shell, the shell itself may be moved to a different processor, and the processes/threads may remain intact within it. All processing in the shell may be stopped before moving it so that there is no chance of having a partially executed thread or process left hanging. In one embodiment, a system manager may move a shell from one server to another by performing a mouse click on an icon representing the shell and dragging it from an icon representing the previous server to an icon representing the new server.

Figure 5:
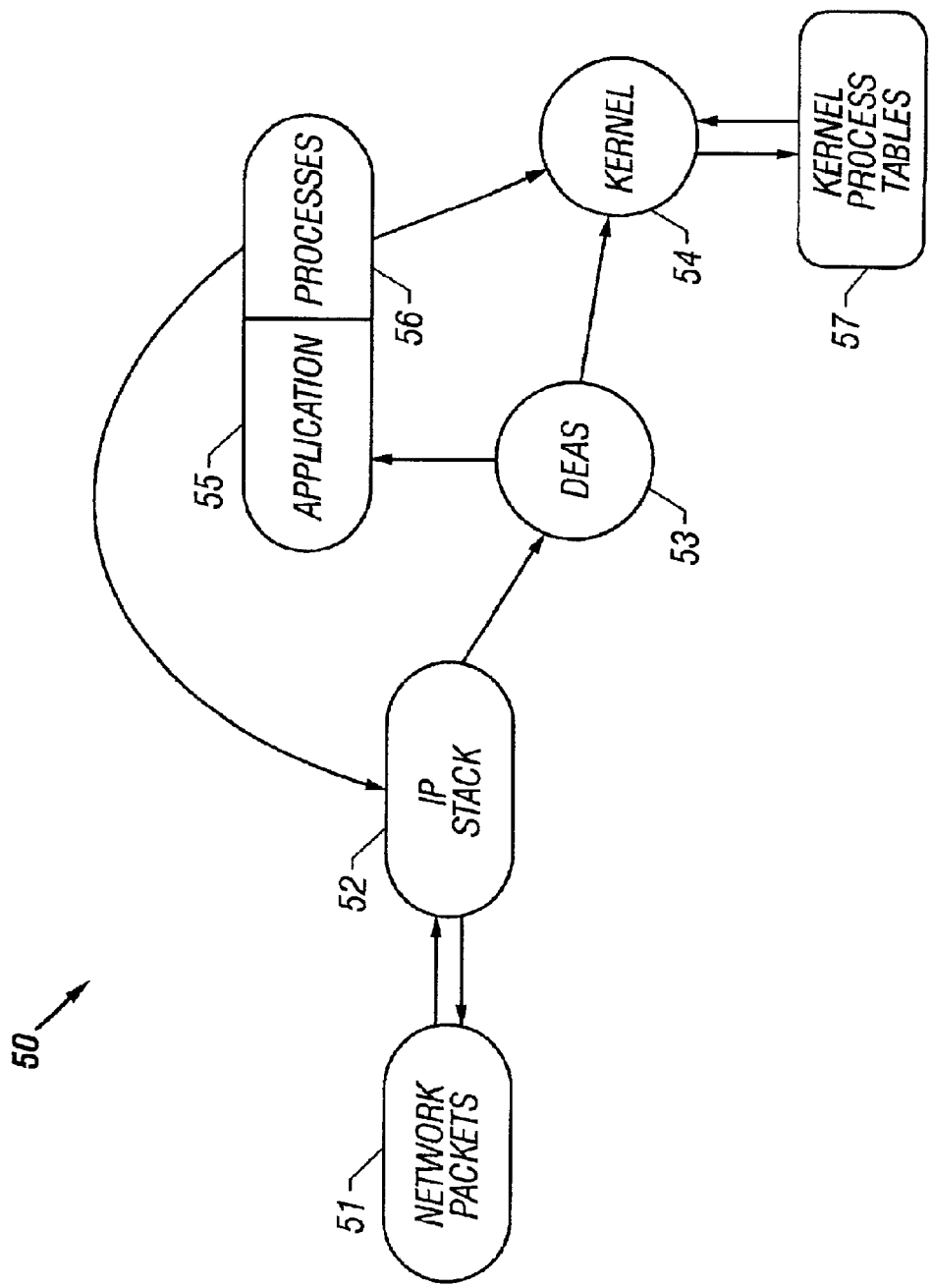
FIG. 5 shows a functional software system diagram.

FIG. 5 shows a functional structure of system level software 50 for at least one embodiment of a domain encapsulation system. Network packets 51 may be received from the network and provided to the IP stack 52. In one embodiment, IP stack 52 may be used for inbound packets, outbound packets, and system requests, so that domain-specific routing, packet source stamping, and socket binding may be implemented. When an inbound packet requests a network service, IP stack 52 may pass the request to a domain encapsulation application starter (DEAS) 53. DEAS 53 may spawn the required application 55 and notify kernel 54 that this application is specific to a domain. Application 55 may trigger processes 56 that are specific to that application and to the indicated domain. Kernel 54 may modify kernel process tables 57 to track which processes belong to which domains, i.e., which processes are correlated with which domains. Whenever a process makes a call to kernel 54, kernel 54 may consult process tables 57 to determine which domain the resultant actions are relative to. Ultimately, the processes 56 of application 55 may deliver outbound packets to IP stack 52 for transmission to the user that requested the network service.

Domain encapsulation may facilitate statistics gathering. In a conventional system, with the various services for a domain scattered across multiple platforms, it is difficult to collect operational statistics such as 'total hits' for a single domain without establishing an integrated communications system between the platforms to request and retrieve statistics collected in the individual computers. With domain encapsulation, all the services for a domain may be collected under a single shell, enabling all the monitoring and collection of performance statistics for that domain to be collected on a single platform. Such statistical information is not limited to operational considerations. Integrated billing information for each client may also be collected, regardless of how many different services a particular client may use.

The invention may be implemented in circuitry or as a method. The invention may also be implemented as instructions stored on a machine-readable medium, which may be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

I claim:

1. A method for processing Internet requests that permits multiple binds to a particular socket number at a particular time on a particular computer, comprising:

receiving a first Internet request having a first IP address;

directing the first request to a first domain processing shell for processing;

binding the first request to the particular socket number in the particular computer;

receiving a second Internet request having a second IP address;

directing the second request to a second domain processing shell for processing; and binding the second request to the particular socket number in the particular computer;

wherein the second binding takes place while the first binding is still active.

2. The method of claim 1, wherein the particular socket number is selected from a full range of permissible socket numbers.

3. The method of claim 1, wherein directing the first request includes allocating the first request from an IP stack.

4. The method of claim 3, wherein directing the second request includes allocating the second request from the IP stack.

5. The method of claim 1, wherein receiving the first Internet request includes receiving with a network interface card.

6. The method of claim 5, wherein receiving the second Internet request includes receiving with the network interface card.

7. The method of claim 1, wherein directing the first and second requests includes using a domain name service table.

8. A machine-readable medium having stored thereon instructions, which when executed by at least one processor cause said at least one processor to perform operations comprising:

receiving a first Internet request having a first IP address;

directing the first request to a first domain processing shell associated with the first IP address for processing;

binding the first request to a particular socket number in a particular computer;

receiving a second Internet request having a second IP address;

directing the second request to a second domain processing shell associated with the second IP address for processing; and binding the second request to the particular socket number in the particular computer;

wherein the second binding takes place while the first binding is still active.

9. The medium of claim 8, wherein the particular socket number is selected from a full range of permissible socket numbers.

10. The medium of claim 8, wherein directing the first request includes allocating the first request from an IP stack.

11. The medium of claim 10, wherein directing the second request includes allocating the second request from the IP stack.

12. The medium of claim 10, wherein receiving the first Internet request includes receiving the first Internet request from a network interface card.

13. The medium of claim 12, wherein receiving the second Internet request includes receiving the second Internet request from the network interface card.

14. The medium of claim 8, wherein directing the first and second requests includes using a domain name service table.

15. An apparatus, for processing Internet requests that permits multiple binds to a particular socket number at a particular time on a particular computer, comprising:

at least one network interface card to receive first and second Internet requests; and an IP stack coupled to the at least one network interface card to distribute the first and second requests to first and second domain processing shells;

wherein the first request is bound to the particular socket number in the first domain processing shell and the second request is bound to the particular socket number in the second domain processing shell while the first request is still bound to the particular socket number in the first domain processing shell.

16. The apparatus of claim 15, wherein:

the first domain processing shell includes a first set of available socket numbers; and the second domain processing shell includes a second set of available socket numbers;

wherein at least one available socket number in the first set duplicates at least one available socket number in the second set.

17. The apparatus of claim 15, further comprising:

process tables correlating a first set of processes to the first domain and correlating a second set of processes to the second domain.

* * * * *